(12) United States Patent
Oshiro (10) Patent No.: US 11,333,735 B2
(45) Date of Patent: May 17, 2022

(54) WIRELESS COMMUNICATION DEVICE AND WIRELESS COMMUNICATION SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masayoshi Oshiro, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 174 days.

(21) Appl. No.: 16/561,079

(22) Filed: Sep. 5, 2019

(65) Prior Publication Data
US 2020/0081089 A1 Mar. 12, 2020

(30) Foreign Application Priority Data
Sep. 10, 2018 (JP) .............................. JP2018-168561

(51) Int. Cl.
*H04B 17/11* (2015.01)
*H04L 25/02* (2006.01)
*G01S 3/48* (2006.01)

(52) U.S. Cl.
CPC ................ *G01S 3/48* (2013.01); *H04B 17/11* (2015.01); *H04L 25/0202* (2013.01)

(58) Field of Classification Search
CPC ........ G01S 3/48; H04B 17/11; H04L 25/0202
See application file for complete search history.

(56) References Cited

U.S. PATENT DOCUMENTS

| 6,624,784 | B1 * | 9/2003 | Yamaguchi | ......... H01Q 3/2605 342/372 |
| 6,735,426 | B1 * | 5/2004 | Pau | ...................... H04B 1/406 455/141 |
| 6,762,717 | B2 | 7/2004 | Hirabe | |
| 6,771,988 | B2 | 8/2004 | Matsuoka et al. | |
| 7,043,275 | B2 | 5/2006 | Matsuoka et al. | |

(Continued)

FOREIGN PATENT DOCUMENTS

| JP | 3872953 B2 | 11/2000 |
| JP | 2002141730 A | 5/2002 |

(Continued)

*Primary Examiner* — Jaison Joseph
(74) *Attorney, Agent, or Firm* — Holtz, Holtz & Volek PC (57) ABSTRACT

A wireless communication device includes a transmission section configured to output a calibration signal transmitted from a calibration antenna, a reception section configured to have input of a received signal from an antenna and obtain a baseband signal from the received signal, a correction phase calculation circuit configured to calculate a correction phase for correcting the baseband signal according to a deviation between a reception phase calculated based on the baseband signal obtained when the antenna receives the calibration signal and an ideal phase associated with the antenna, and a storage section configured to store the ideal phase and the correction phase.

12 Claims, 6 Drawing Sheets

(56) References Cited

U.S. PATENT DOCUMENTS

| | | | | |
|---|---|---|---|---|
| 7,545,321 | B2* | 6/2009 | Kawasaki | H01Q 3/267 |
| | | | | 342/174 |
| 7,593,826 | B2* | 9/2009 | Weese | H01Q 3/267 |
| | | | | 702/106 |
| 8,219,035 | B2* | 7/2012 | Kusyk | H01Q 3/267 |
| | | | | 455/67.11 |
| 8,593,337 | B2* | 11/2013 | Ookawa | H01Q 3/36 |
| | | | | 342/174 |
| 8,878,719 | B2* | 11/2014 | Nakabayashi | G01S 7/35 |
| | | | | 342/174 |
| 8,957,808 | B2* | 2/2015 | Ookawa | G01S 7/40 |
| | | | | 342/174 |
| 10,484,106 | B2* | 11/2019 | Garcia | H04B 17/12 |
| 2003/0058166 | A1* | 3/2003 | Hirabe | H01Q 3/267 |
| | | | | 342/368 |
| 2004/0032365 | A1* | 2/2004 | Gotti | H01Q 1/246 |
| | | | | 342/368 |
| 2006/0019712 | A1* | 1/2006 | Choi | H04B 17/21 |
| | | | | 455/562.1 |
| 2006/0279459 | A1* | 12/2006 | Akiyama | H01Q 3/267 |
| | | | | 342/372 |
| 2019/0053124 | A1* | 2/2019 | Bitra | H04W 76/10 |
| 2020/0266879 | A1* | 8/2020 | Chia | H04B 7/15535 |

FOREIGN PATENT DOCUMENTS

| | | |
|---|---|---|
| JP | 3651430 B2 | 3/2005 |
| JP | 4478606 B2 | 3/2010 |
| JP | 2017112573 A | 6/2017 |

* cited by examiner

WIRELESS COMMUNICATION DEVICE AND WIRELESS COMMUNICATION SYSTEM

CROSS REFERENCE TO RELATED APPLICATION

This application is based upon and claims the benefit of priority from the prior Japanese Patent Application No. 2018-168561 filed in Japan on Sep. 10, 2018; the entire contents of which are incorporated herein by reference.

FIELD

An embodiment of the present invention herein relates generally to a wireless communication device and wireless communication system.

BACKGROUND

A wireless communication system has been used to receive a radio wave by an antennas array in which a plurality of antennas are arranged, and to estimate arrival angles of the radio wave. The wireless communication system estimates an arrival angle by a phase difference among received signals caused by a difference of respective antenna positions.

In the wireless communication system, in addition to the difference of respective antenna positions, an internal propagation route connected to each antenna also causes a phase change of received signals. When there is a phase error due to a manufacturing error or environmental change, accuracy of arrival angle estimation may deteriorate in the wireless communication system.

DETAILED DESCRIPTION

A wireless communication device according to an embodiment includes a transmission section, a reception section, a correction phase calculation circuit and a storage section. The transmission section outputs a calibration signal that is transmitted from a calibration antenna. The reception section has input of a received signal from an antenna that receives a calibration signal, and obtains a baseband signal from the received signal. The correction phase calculation circuit calculates a correction phase to correct a baseband signal according to a deviation between a reception phase calculated based on a baseband signal and an ideal phase associated with the antenna. The storage section stores the ideal phase and the correction phase.

In the following, an embodiment is explained with reference to drawings.

Figure 1:
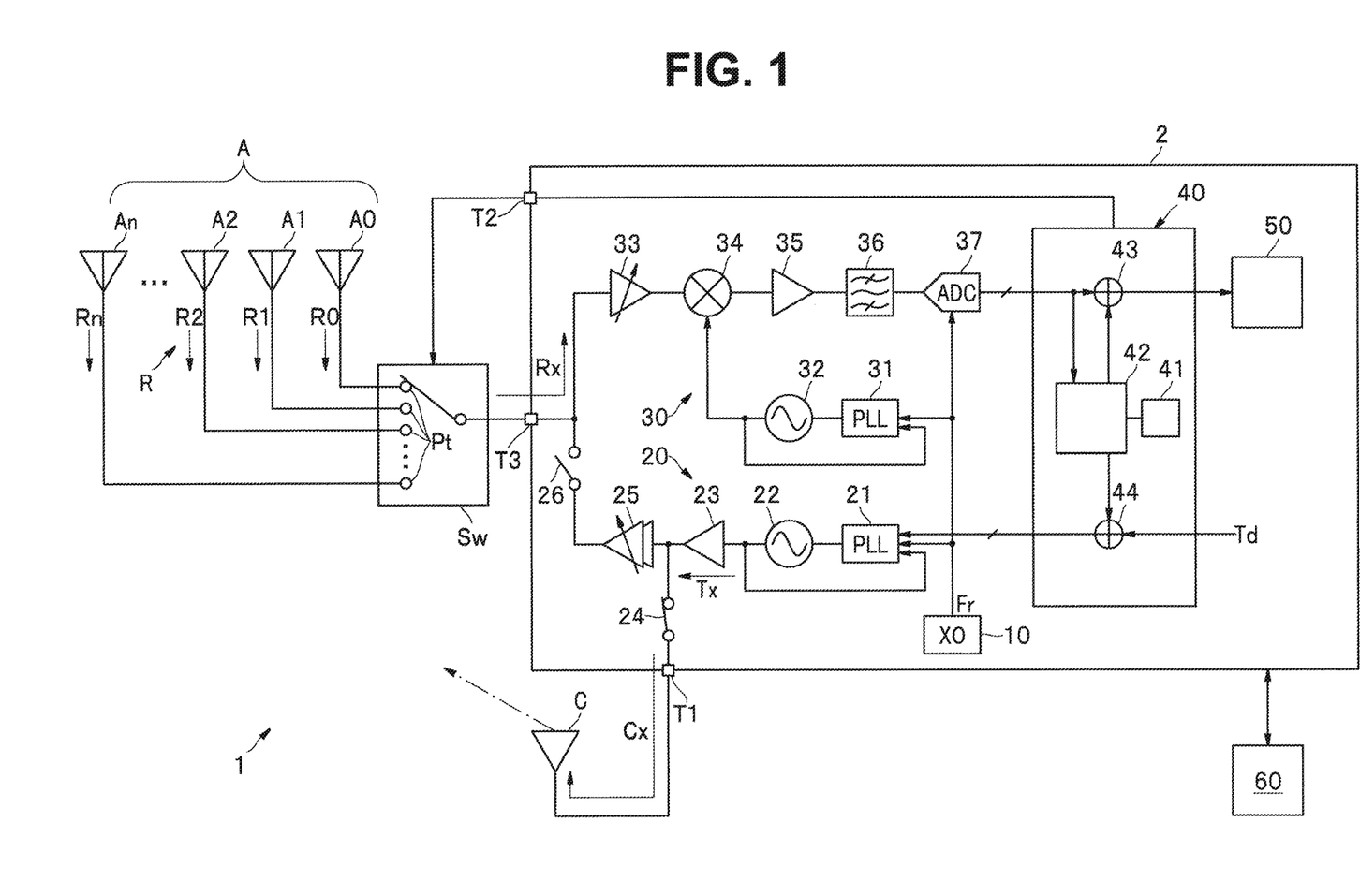
FIG. 1 is a circuit diagram showing an example of a configuration of a wireless communication system according to an embodiment.

FIG. 1 is a circuit diagram showing an example of a configuration of a wireless communication system 1 according to an embodiment.

The wireless communication system 1 includes a calibration antenna C, n+1 pieces of antennas A0 to An, an antenna switch Sw, a wireless communication device 2 and a control section 60. In the following, the antennas A0 to An are entirely or partially referred to as the antennas A. Here, n is an integer equal to 1 or above.

The calibration antenna C is connected to an external terminal T1 of the wireless communication device 2. The calibration antenna C transmits a calibration signal Cx received from the external terminal T1.

The antennas A are connected to ports Pt of the antenna switch Sw respectively. The antennas A are spaced apart from each other by a predetermined interval d and arranged in positions to receive, at a predetermined arrival angle θ, the calibration signal Cx transmitted from the calibration antenna C. The predetermined arrival angle θ is set beforehand by approximating the calibration signal Cx to a plane wave. The antennas A receive the calibration signal Cx and output received signals R0 to Rn to the antenna switch Sw respectively. In the following, the received signals R0 to Rn are entirely or partially referred to as the received signals R.

The antenna switch Sw is connected to external terminals T2, T3 of the wireless communication device 2. The antenna switch Sw has a plurality of ports Pt connected to the antennas A respectively. The antenna switch Sw switches the ports Pt sequentially according to a control signal received from the external terminal T2 so that any one of the ports Pt is connected to the external terminal T3. The received signals R are time-divided and outputted as received signals Rx to the external terminal T3.

The wireless communication device 2 includes a reference oscillator 10, a transmission section 20, a reception section 30, a modem section 40 and an arrival angle estimation section 50.

The reference oscillator 10 generates a reference signal Fr having a reference frequency so as to output the reference signal Fr to the transmission section 20 and the reception section 30. The reference oscillator 10 is composed of, for example, a crystal oscillator.

The transmission section 20 includes a PLL circuit (phase locked loop circuit) 21, a TXVCO circuit (transmission voltage controlling oscillation circuit) 22, a buffer 23, a calibration switch 24, a power amplifier 25, and a transmission/reception changeover switch 26.

The PLL circuit 21 receives the reference signal Fr and also receives a first oscillation signal fed back from the TXVCO circuit 22. The PLL circuit 21 generates a first PLL signal by phase-locking the reference signal Fr and the first oscillation signal so as to output the first PLL signal to the TXVCO circuit 22.

The TXVCO circuit 22 generates a first oscillation signal based on the first PLL signal so as to feed back to the PLL circuit 21. The TXVCO circuit 22 also generates, based on the first oscillation signal and transmission data Td received from the modem section 40, a transmission signal Tx having a predetermined first frequency so as to output the transmission signal Tx to the buffer 23.

The buffer 23 amplifies the transmission signal Tx.

The calibration switch 24 is connected to the external terminal T1. The calibration switch 24 can switch, under control of the control section 60, a state between the buffer 23 and the external terminal T1 to either a connected state or a cutoff state. The transmission signal Tx supplied to the external terminal T1 constitutes the calibration signal Cx.

The power amplifier 25 amplifies the transmission signal Tx received from the buffer 23 so as to output the transmission signal Tx to the transmission/reception changeover switch 26.

The transmission/reception changeover switch 26 is connected to the external terminal T3. The transmission/reception changeover switch 26 can switch, under control of the control section 60, a state between the power amplifier 25 and the external terminal T3 to either a connected state or a cutoff state.

When the calibration switch 24 sets a connected state and the transmission/reception changeover switch 26 sets a cutoff state, the transmission signal Tx outputted from the buffer 23 is supplied to the external terminal T1. In contrast, when the calibration switch 24 sets a cutoff state and the transmission/reception changeover switch 26 sets a connected state, the transmission signal Tx outputted from the buffer 23 is supplied to the external terminal T3.

The reception section 30 includes a PLL circuit 31, an RXVCO circuit (reception voltage controlling oscillation circuit) 32, a low-noise amplifier 33, a mixer 34, an amplifier 35, a bandpass filter 36 and an AD converter 37.

The PLL circuit 31 receives the reference signal Fr and also receives a second oscillation signal fed back from the RXVCO circuit 32. The PLL circuit 31 generates a second PLL signal by phase-locking the reference signal Fr and the second oscillation signal so as to output the second PLL signal to the RXVCO circuit 32.

The RXVCO circuit 32 generates, based on the second PLL signal, a second oscillation signal that is outputted to the mixer 34. The second oscillation signal is set to have a predetermined second frequency and contains an I local oscillation signal and a Q local oscillation signal of which phases are different from each other by 90 degrees. The predetermined second frequency is preset to a frequency by which the received signals Rx can be down-converted to obtain baseband signals.

The low-noise amplifier 33 is connected to the external terminal T3 and the mixer 34. The low-noise amplifier 33 can change a gain and amplifies the received signals Rx according to a predetermined gain so as to output the received signals Rx to the mixer 34.

The mixer 34 generates baseband signals by down-converting the inputted received signals Rx using the second oscillation signal. More specifically, the mixer 34 generates an I signal by mixing the received signals Rx with the I local oscillation signal, and also generates a Q signal by mixing the received signals Rx with the Q local oscillation signal. The mixer 34 outputs baseband signals containing the I signal and the Q signal to the amplifier 35.

The amplifier 35 amplifies the baseband signals so as to output the baseband signals to the bandpass filter 36. The bandpass filter 36 attenuates out-of-band signals received from the amplifier 35 so as to output the out-of-band signals to the AD converter 37. The AD converter 37 converts, according to the reference signal Fr, the baseband signals received from the bandpass filter 36 into digital signals that are outputted to the modem section 40.

The modem section 40 outputs, via the external terminal T2, a control signal for switching the ports Pt to the antenna switch Sw. The modem section 40 sequentially receives, according to switching of the ports Pt, via the low-noise amplifier 33 through the AD converter 37, signals received by the antennas A. The modem section 40 divides, according to a predetermined cycle, time-divide signals received from the reception section 30, obtains a baseband signal associated with the antennas A, and corrects phases of the baseband signals so as to output the baseband signals to the arrival angle estimation section 50. The modem section 40 includes a storage section 41, a phase correction circuit 42 and phase shifter 43.

The storage section 41 is composed of, for example, a resistor. The storage section 41 can store, under control of the phase correction circuit 42, ideal phases $\theta i0$ to $\theta in$ and correction phases $\theta s0$ to $\theta sn$ that are associated with the antennas A respectively. In the following, the ideal phases $\theta i0$ to $\theta in$ are entirely or partially referred to as the ideal phases $\theta i$, and the correction phases $\theta s0$ to $\theta sn$ are entirely or partially referred to as the correction phases $\theta s$.

The ideal phases $\theta i$ are ideal for the antennas A respectively. The ideal phases $\theta i$ are predetermined so that the arrival angle estimation section 50 can estimate arrival angles appropriately. The correction phases $\theta s$ are used to correct reception phases $\theta r$.

The phase correction circuit 42 serving as a correction phase calculation circuit calculates reception phases $\theta r0$ to $\theta rn$ from baseband signals, and calculates the correction phases $\theta s0$ to $\theta sn$ that represent differences to the ideal phases $\theta i$. In the following, the reception phases $\theta r0$ to $\theta rn$ are entirely or partially referred to as the reception phases $\theta r$. The phase correction circuit 42 also outputs the correction phases $\theta s$ to the phase shifter 43.

The phase shifter 43 corrects baseband signals according to the correction phases $\theta s$ so as to output the baseband signals to the arrival angle estimation section 50.

The arrival angle estimation section 50 estimates arrival angles based on corrected baseband signals and using an arrival angle estimation technique such as, beamformer method and MUSIC method.

The control section 60 controls operation of each of the components in the wireless communication device 2. The control section 60 performs switching of the calibration switch 24 and the transmission/reception changeover switch 26 and switching of a calibration mode, an arrival angle estimation mode and a transmission mode, according to an instruction by a user.

In the calibration mode, the control section 60 makes the calibration switch 24 set a connected state and makes the transmission/reception changeover switch 26 set a cutoff state. In the calibration mode, the calibration signal Cx transmitted from the calibration antenna C is received by the antennas A.

In the arrival angle estimation mode, the control section 60 makes the calibration switch 24 set a cutoff state. In the arrival angle estimation mode, an external signal transmitted by an external apparatus is received by the antennas A to estimate arrival angles.

Additionally, in the transmission mode, the control section 60 makes the calibration switch 24 set a cutoff state and makes the transmission/reception changeover switch 26 set a connected state. In the transmission mode, the antennas A transmit the transmission signal Tx to the outside. More specifically, in the transmission mode, a phase shifter 44 corrects a phase of the transmission data Td according to the correction phases $\theta s$ outputted from phase correction circuit 42, and generates the transmission signal Tx. The transmission signal Tx is amplified by the power amplifier 25. The ports Pt are switched according to a control signal and the transmission signal Tx is transmitted from the antennas A.

In other words, the wireless communication device 2 includes the transmission section 20, the reception section 30 and the modem section 40. The transmission section 20 outputs the calibration signal Cx that is transmitted from the calibration antenna C. The reception section 30 receives the received signals Rx from the antennas A that received the calibration signal Cx, and obtains baseband signals from the received signals Rx. The modem section 40 calculates the correction phases θs for use in correcting baseband signals, according to deviations between the reception phases θr calculated based on baseband signals and the ideal phases θi.

The reception section 30 also obtains time-divided baseband signals from the received signals Rx. The phase correction circuit 42 calculates the reception phases θr from baseband signals that are divided according to a predetermined cycle, and calculates the correction phases θs according to deviations to the ideal phases θi.

The PLL circuit 21 and the TXVCO circuit 22 constitute a first oscillator. The PLL circuit 31 and RXVCO circuit 32 constitute a second oscillator. The reference oscillator 10 outputs the reference signal Fr to the first oscillator and the second oscillator. The first oscillator generates, based on the reference signal Fr, a first oscillation signal used as the calibration signal Cx. The second oscillator generates, based on the reference signal Fr, a second oscillation signal for obtaining baseband signals from the received signals Rx.

(Phase Difference of the Received Signals R)

Figure 2:
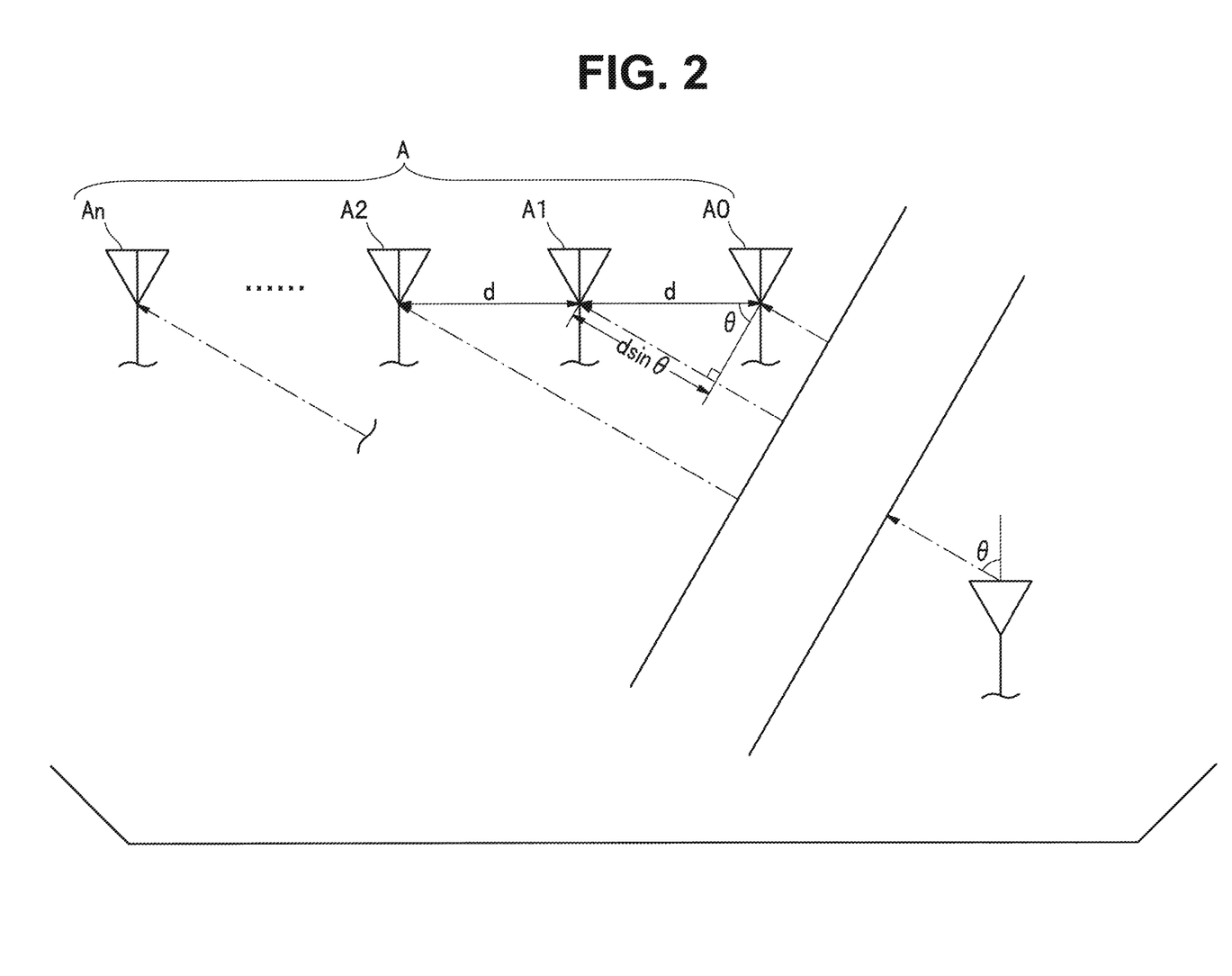
FIG. 2 is an explanatory diagram to explain an example of a phase difference due to arrangement of antennas in the wireless communication system according to the embodiment.

Next, a phase difference of the received signals R is explained. FIG. 2 is an explanatory diagram to explain an example of a phase difference due to arrangement of the antennas A. FIG. 2 shows an example in which the calibration signal Cx from the calibration antenna C arrives at the antennas A.

The antennas A0 and A1 are spaced apart from each other by the predetermined interval d and the calibration signal Cx arrives at the predetermined arrival angle θ. Note that FIG. 2 shows the antennas A arranged in one row but the arrangement of the antennas A is not limited to one row but may be in any form of arrangement.

A phase difference due to arrangement is a phase difference among the received signals R caused by a positional difference of the antennas A. A phase difference due to arrangement is observed according to a difference of propagation distances of the calibration signal Cx from the calibration antenna C to the antennas A.

For example, the antenna A1 has a longer propagation distance of the calibration signal Cx than the antenna A0 by d sin θ so that there is a phase difference due to arrangement between the received signals R0 and R1. A phase difference due to arrangement between the antennas A0 and A1 is as expressed in the following equation (1). In the equation (1), α represents a phase difference due to arrangement between the antennas A0 and A1, and λ represents a wavelength.

$$\alpha 10 = -(2\pi/\lambda) \times d \sin \theta \qquad (1)$$

Figure 3:
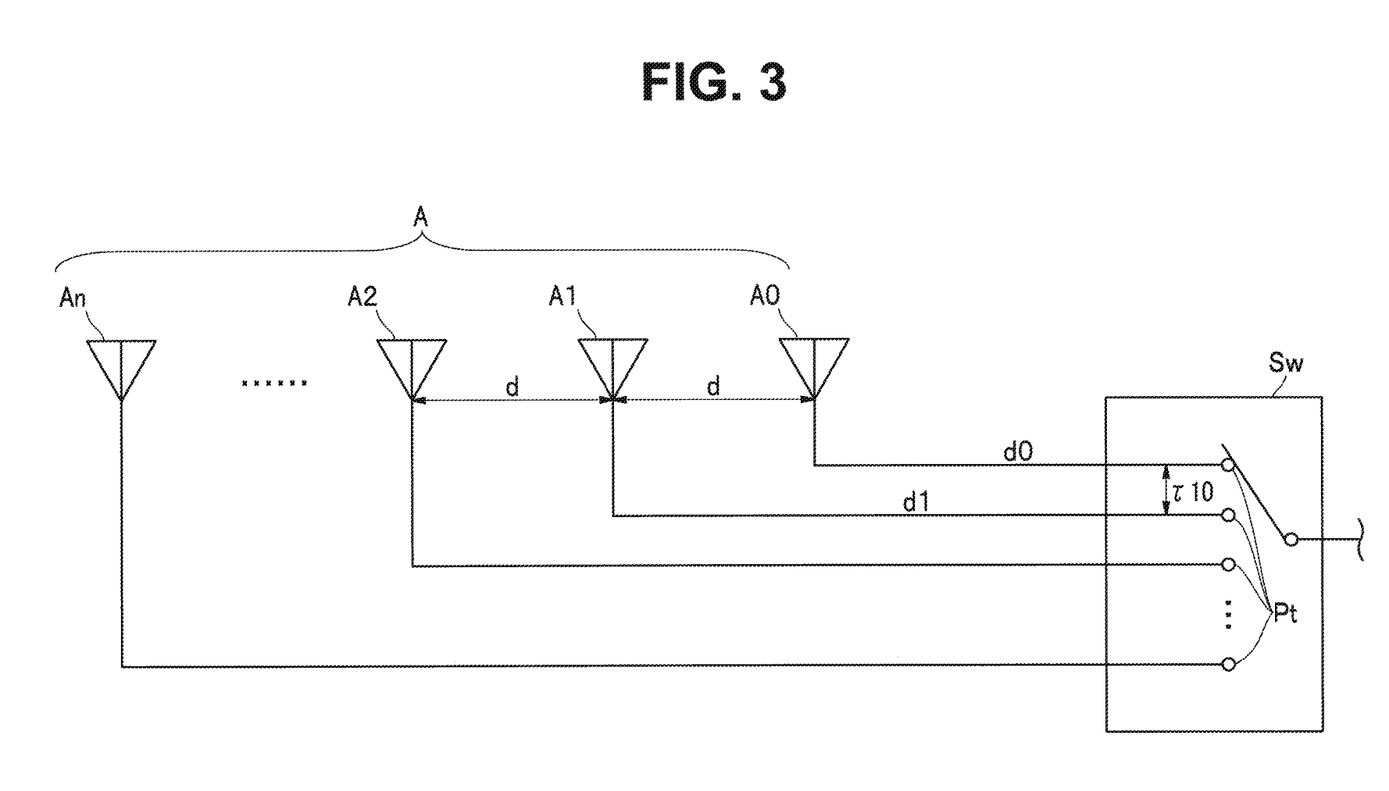
FIG. 3 is an explanatory diagram to explain an example of a phase difference due to routing in the wireless communication system according to the embodiment.

FIG. 3 is an explanatory diagram to explain an example of a phase difference due to routing. The antenna A0 is connected to the antenna switch Sw by a wiring having a wiring length d0, and the antenna A1 is connected to the switch Sw by a wiring having a wiring length d1. A phase difference due to wiring lengths resulting from the wiring lengths d0 and d1 is as expressed by the following equation (2).

$$\beta 10 = -(2\pi/\lambda) \times (d1 - d0) \qquad (2)$$

The antenna switch Sw also causes a phase difference due to switching depending on an internal layout of IC. A phase difference due to switching is, in general, not determined by specifications. A phase difference due to wiring lengths and a phase difference due to switching constitute a phase difference due to routing resulting from a difference of propagation route lengths of the received signals R.

By consolidating a phase difference due to arrangement, a phase difference due to wiring lengths and a phase difference due to switching, a total phase difference of the received signals R between the antennas A0 and A1 is expressed in the following equation (3). In the equation (3), τ10 represents a phase difference due to switching between the antennas A0 and A1.

$$\psi 10 = \alpha 10 + \beta 10 + \tau 10 \qquad (3)$$

The ideal phases θi are determined by calculating a phase difference due to arrangement according to the predetermined arrival angle θ and predetermined interval d. For example, assuming that the ideal phase θi0 of the antenna A0 is 0 degree, the ideal phase θi1 of the antenna A1 is calculated as follows: θi1=−(2π/λ)×d sin θ. Further, when the antennas A1 and A2 are also spaced apart from each other by the predetermined interval d, the ideal phase θi2 of the antenna A2 based on the antenna A0 is calculated as follows: θi2=−(2π/λ)×2d sin θ.

(Operation)

Figure 4:
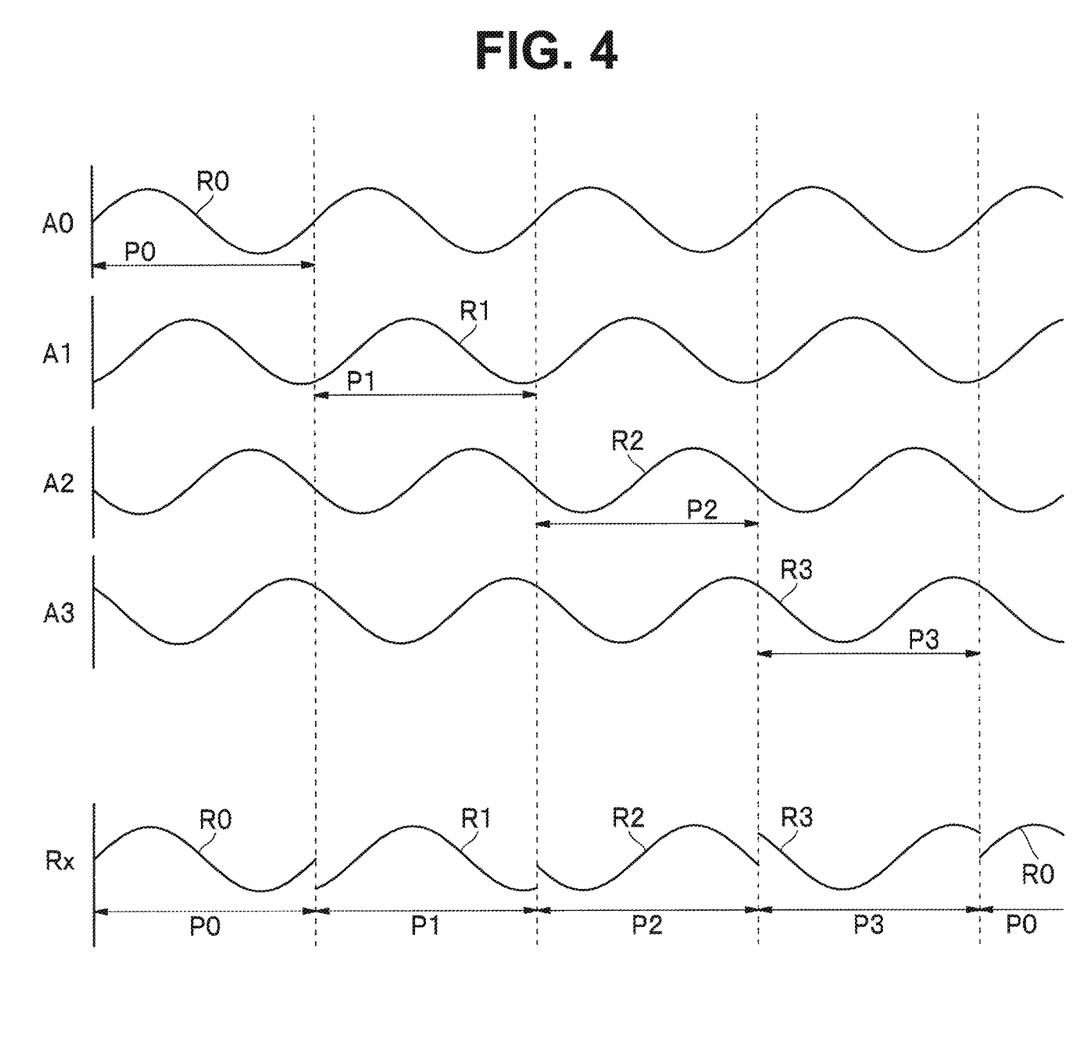
FIG. 4 is a waveform diagram showing waveforms of received signals obtained by receiving a calibration signal in each antenna in the wireless communication system according to the embodiment.
Figure 5:
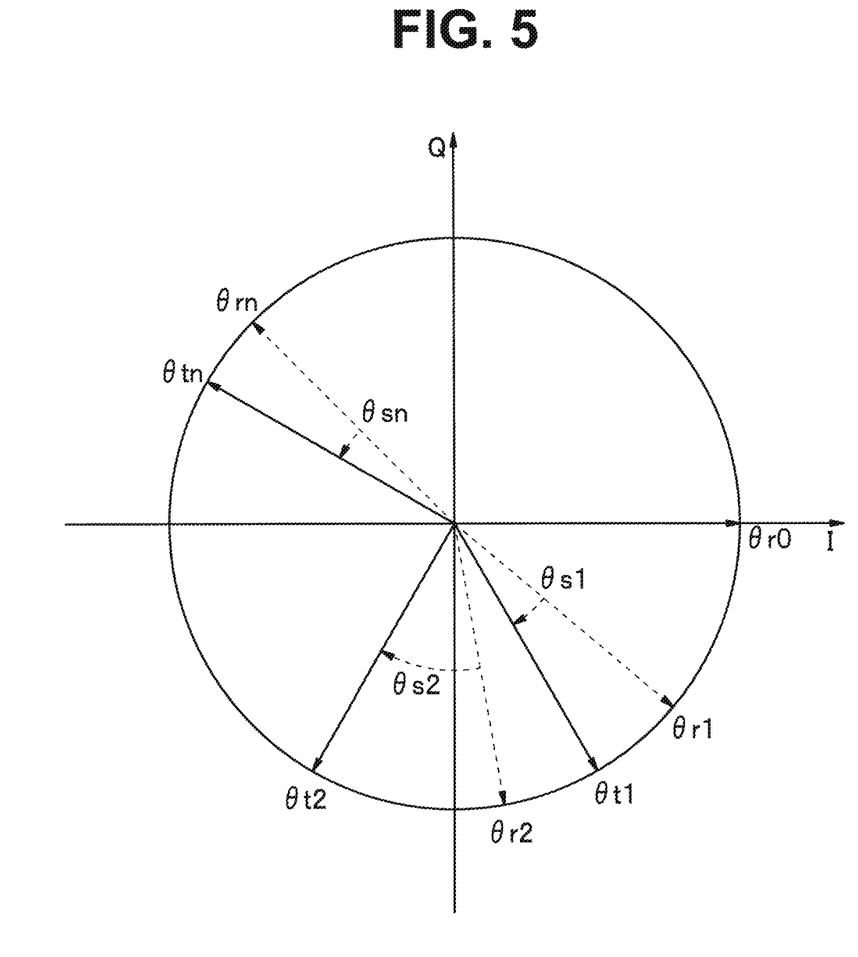
FIG. 5 is an explanatory diagram to explain correction phases in the wireless communication system according to the embodiment.

Next, it is explained how the wireless communication system 1 operates. FIG. 4 is a waveform diagram showing waveforms of the received signals R in the antennas A in the calibration mode. FIG. 5 is an explanatory diagram to explain the correction phases θs. In FIG. 4, a case where n is equal to 3 is explained as an example.

When a user inputs an instruction to the control section 60 to start a calibration process, the control section 60 outputs a control signal and makes the calibration switch 24 set a connected state and makes the transmission/reception changeover switch 26 set a cutoff state.

The reference oscillator 10 outputs the reference signal Fr to the PLL circuit 21. The PLL circuit 21 and the TXVCO circuit 22 phase-lock the reference signal Fr so that a sine wave of, for example, 2441 MHz as a first predetermined frequency is outputted to the buffer 23. The buffer 23 supplies, to the external terminal T1, the calibration signal Cx of the sine wave obtained by amplifying the first oscillation signal. The calibration antenna C transmits the calibration signal Cx received from the external terminal T1.

The antennas A receive the calibration signal Cx. The antenna A0 obtains the received signal R0, the antenna A1 obtains the received signal R1, the antenna A2 obtains the received signal R2, and the antenna A3 obtains the received signal R3.

The antennas A output the received signals R to the antenna switch Sw. The antenna switch Sw switches the ports Pt according to a control signal received from the modem section 40. The ports Pt are switched to be connected according to a predetermined cycle and the time-divided received signals Rx are inputted to the external terminal T3. For example, the antenna switch Sw outputs, to the external terminal T3, the received signal R0 inputted from the antenna A0 in a period P0, the received signal R1 inputted from the antennas A1 in a period P1, the received signal R2 inputted from the antenna A2 in a period P2, and the received signal R3 inputted from the antenna A3 in a period P3.

The reference oscillator 10 also outputs the reference signal Fr to the PLL circuit 31. The PLL circuit 31 and the RXVCO circuit 32 output to the mixer 34 the second oscillation signal containing the I local oscillation signal and the Q local oscillation signal.

The low-noise amplifier 33 amplifies the received signals Rx that are outputted to the mixer 34. The mixer 34 mixes each of the I local oscillation signal and the Q local oscillation signal with the received signals Rx and obtains baseband signals of 1 MHz containing the I signal and the Q signal so as to output the baseband signals to the amplifier 35. The amplifier 35 amplifies the baseband signals. The bandpass filter 36 filters the baseband signals. The AD converter 37 digitalizes the baseband signals according to the reference signal Fr so as to output the baseband signals to the phase correction circuit 42.

The phase correction circuit 42 obtains baseband signals of received signals R which are divided according to a predetermined cycle. The phase correction circuit 42 calculates the reception phases θr for the time-divided baseband signals respectively. For example, the phase correction circuit 42 may also calculate the reception phases θr according to an operation shown in the following equation (4). In the equation (4), Q represents a Q signal value and I represents an I signal value.

$$\theta r = \arctan(Q/I) \quad (4)$$

The phase correction circuit 42 reads the ideal phases θi and, for example, calculates the correction phases θs according to an operation shown in the following equation (5).

$$\theta s = \theta i - \theta r \quad (5)$$

The phase correction circuit 42 associates the calculated correction phases θs with the antennas A respectively which are stored in the storage section 41.

Next, it is explained how the arrival angle estimation mode operates. When a user inputs an instruction to the control section 60 to start a reception process, the control section 60 outputs a control signal to set the calibration switch 24 and the transmission/reception changeover switch 26 to a cutoff state and set the wireless communication device 2 to an arrival angle estimation mode.

The antennas A output the received signals R to the antenna switch Sw. The antenna switch Sw switches, according to the control signal, the antennas A to be connected according to a predetermined cycle and outputs, via the external terminal T3, the time-divided received signals Rx to the low-noise amplifier 33. The low-noise amplifier 33 amplifies the received signals Rx so as to output the received signals Rx to the mixer 34.

The mixer 34 mixes the received signals Rx and the second oscillation signal and obtains baseband signals that are outputted to the amplifier 35. The baseband signals are amplified by the amplifier 35, filtered by the bandpass filter 36, digitalized by the AD converter 37, and outputted to the phase shifter 43.

The phase correction circuit 42 reads the correction phases θs from the storage section 41 so as to output the correction phases θs to the phase shifter 43. The phase shifter 43 corrects phases of the baseband signals by the correction phases θs so as to output the baseband signals with phases corrected to the arrival angle estimation section 50. The arrival angle estimation section 50 estimates arrival angles of the received signals R based on the baseband signals with phases corrected.

For example, in FIG. 5, a reception phase θr0 of the antenna A0 is normalized to 0 degree. More specifically, on an IQ plane of FIG. 5, the reception phase θr0 is shown at a phase angle of 0 degree. The reception phases θr1, θr2 and θrn are shown at phase angles corresponding to phase differences to the reception phase θr0 respectively. The phase correction circuit 42 outputs the correction phases θs to the phase shifter 43. The phase shifter 43 shifts the reception phase θr1, θr2 and θrn to corrected phases θt1, θt2 and θtn according to the correction phases θs1, θs2 and θsn so as to output the corrected phases θt1, θt2 and θtn to the arrival angle estimation section 50.

This is how the wireless communication device 2 can correct the reception phases θr of the received signals Rx and estimate arrival angles with higher accuracy.

The reference signal Fr for generating the calibration signal Cx is also used in common by the wireless communication device 2 to down-convert the received signals Rx so that frequency deviation in down conversion can be suppressed.

The wireless communication device 2 also calculates the ideal phases θi based on the predetermined interval d and the predetermined arrival angle θ, and calculates the correction phases θs according to deviations between the ideal phases θi and the reception phases θr. By using the correction phases θs, the wireless communication device 2 can correct not only arrangement deviation of the antennas A but also phase deviation resulting from a phase shift due to routing.

According to the embodiment, in the wireless communication system 1 and the wireless communication device 2, it is possible to simplify calibration of a phase difference caused by arrangement position deviation of the antennas A, and a phase difference caused by a difference of internal routes connected to the antennas A respectively.

(Modification of the Embodiment)

According to the embodiment, a plane wave to which the calibration signal Cx approximates may also be a spherical wave.

Figure 6:
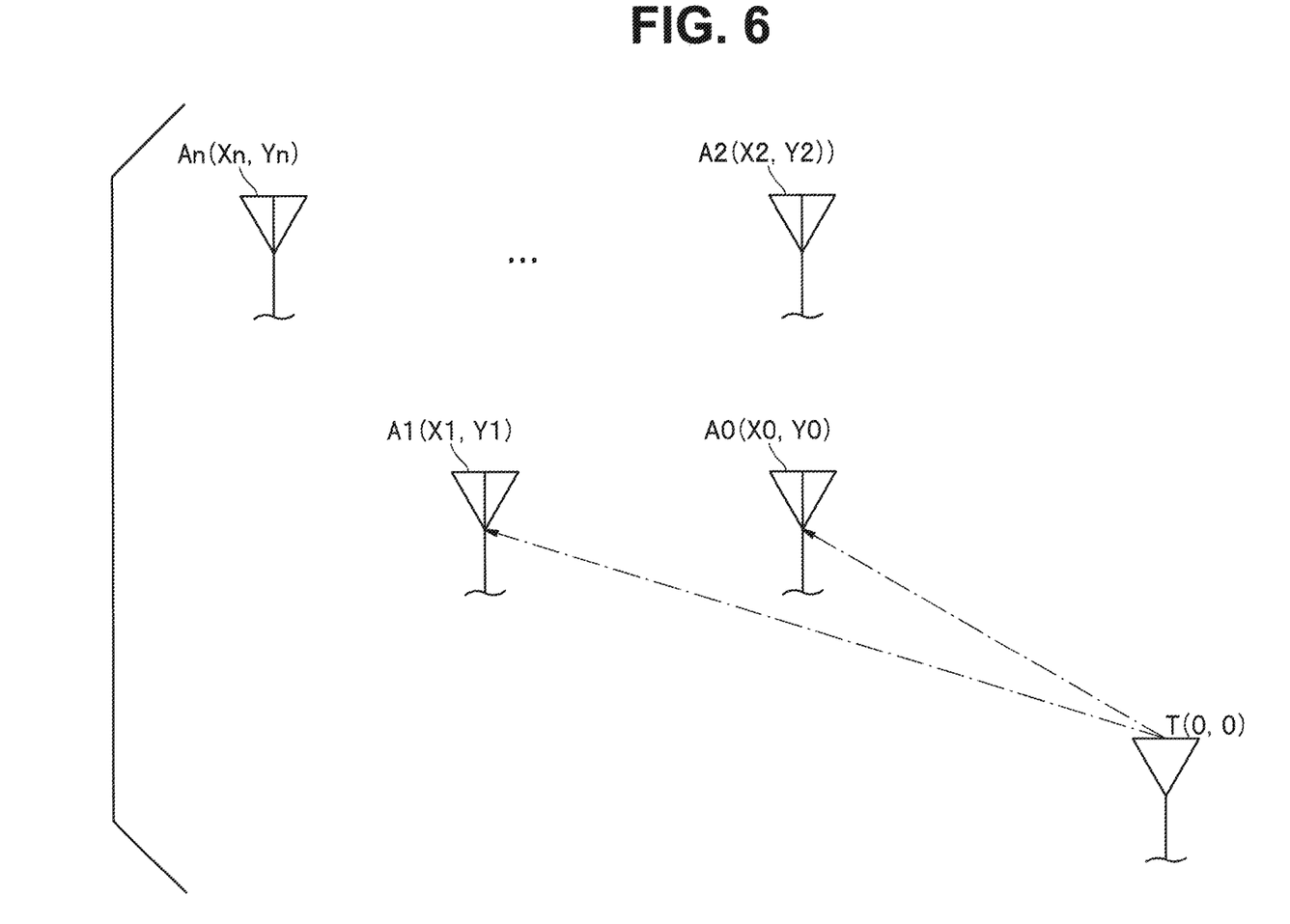
FIG. 6 is an explanatory diagram to explain an example of a phase difference due to antennas arrangement in a wireless communication system according to a modification of the embodiment.

FIG. 6 is an explanatory diagram to explain an example of a phase difference due to arrangement of the antennas A according to a modification of the embodiment. In the modification, explanation of components that are the same as the components of the embodiment is omitted.

The antennas A have predetermined coordinates based on the calibration antenna C. In the example of FIG. 6, it is predetermined that the antenna A0 has coordinates (X0, Y0), antenna A1 has coordinates (X1, Y1), the antenna A2 has coordinates (X2, Y2), and the antenna An has coordinates (Xn, Yn).

A phase difference due to arrangement between the antennas A0 and A1 is as expressed in the following equation (6).

$$\alpha 10 = -(2\pi/\lambda) \times \{(X1^2+Y1^2)^{1/2} - (X0^2+Y0^2)^{1/2}\} \quad (6)$$

Hence, the ideal phase θi1 of the antenna A1 in the modification is as follows: θi1=α10

According to the modification of the embodiment, in the wireless communication system 1 and the wireless communication device 2, it is possible to simplify calibration of a phase difference caused by arrangement position deviation of the antennas A and a phase difference caused by a difference of internal routes connected to the antennas A by predetermining coordinates of the antennas A even if the calibration signal Cx has a spherical wave.

Note that functions of the modem section 40, the arrival angle estimation section 50 and the control section 60 may be entirely or partially realized by a circuit, or may also be realized by a processor configured to execute a program stored in a memory in the embodiment and the modification.

Note that even though the embodiment and modification were explained based on the example where the storage section 41 is a resistor, there is no limitation of such an example and a memory such as a flash ROM arranged inside or outside the modem section 40 may also be used.

Note that even though the predetermined second frequency is set to be lower than the predetermined first frequency in the embodiment and the modification, these frequencies may be set to be identical. In this case, the transmission section 20 generates the calibration signal Cx by up-converting the transmission data Td for calibration according to the first oscillation signal of the predetermined first frequency, and the reception section 30 obtains baseband signals by down-converting received signals according to the second oscillation signal of the predetermined second frequency.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A wireless communication device comprising:
    an antenna switch configured to time-divide and incorporate a plurality of received signals from a plurality of antennas and to supply the plurality of received signals to a reception section;
    a reference oscillator configured to output a reference signal;
    a transmission section including a first oscillator configured to generate, based on the reference signal, a first oscillation signal used as a transmission signal;
    the reception section, the reception section being configured to receive input of a received signal from one of the plurality of antennas and to obtain a baseband signal from the received signal, by using a second oscillation signal generated based on the reference signal;
    a control circuit configured to perform control so as to supply the transmission signal to the antenna switch at a time of transmission, and to supply the transmission signal to a calibration antenna, as a calibration signal, at a time of calibration;
    a first switch provided between the transmission section and the calibration antenna;
    a second switch provided between the transmission section and the antenna switch;
    a correction phase calculation circuit configured to calculate a correction phase for correcting the baseband signal according to a deviation between a reception phase calculated based on the baseband signal obtained when the plurality of antennas receive the calibration signal transmitted from the calibration antenna and an ideal phase associated with the plurality of antennas;
    a storage section configured to store the ideal phase and the correction phase;
    a phase shifter configured to correct, based on the correction phase, a phase of the baseband signal obtained when the plurality of antennas receive a transmission signal from an unknown direction; and
    an arrival angle estimation section configured to estimate an arrival angle of the received transmission signal based on an output of the phase shifter;
    wherein:
    the wireless communication device is selectively operable in a calibration mode and a transmission mode,
    in the calibration mode, the control circuit controls to set the first switch to a connected state to connect the transmission section to the calibration antenna and to set the second switch to a cutoff state to disconnect the transmission section from the antenna switch, so as to enable the supply of the calibration signal to the calibration antenna at the time of calibration, and
    in the transmission mode, the control circuit controls to set the first switch to a cutoff state to disconnect the transmission section from the calibration antenna and to set the second switch to a connected state to connect the transmission section to the antenna switch, so as to enable the supply of the transmission signal to the antenna switch at the time of transmission.

2. The wireless communication device according to claim 1, wherein:
    the reception section obtains the baseband signal being time-divided from the received signal; and
    the correction phase calculation circuit calculates the reception phase from the time-divided baseband signal, and calculates the correction phase according to a deviation to the ideal phase.

3. The wireless communication device according to claim 2, wherein the antenna switch is configured to switch and incorporate a plurality of received signals according to a predetermined cycle.

4. The wireless communication device according to claim 1, wherein frequencies of the first and the second oscillation signals are set to have a predetermined frequency difference.

5. The wireless communication device according to claim 4, wherein:
    the antenna switch is configured to switch and incorporate a plurality of received signals according to a cycle of the baseband signal;
    the reception section obtains the baseband signal being time-divided from an output of the antenna switch; and
    the correction phase calculation circuit calculates the reception phase from the time-divided baseband signal, and calculates the correction phase according to a deviation to the ideal phase.

6. The wireless communication device according to claim 1, wherein:
    the antenna switch comprises a plurality of ports,
    each of the plurality of antennas is connected to a respective one of the plurality of ports, and
    switching between the ports is performed according to a control signal.

7. The wireless communication device according to claim 1, wherein the correction phase corrects a total phase difference introduced in the received signal, the total phase difference including a phase difference caused due to an arrangement of the plurality of antennas, a phase difference due to respective wiring lengths of the plurality of antennas, and a phase difference due to switching performed in the antenna switch.

8. The wireless communication device according to claim 7, wherein the correction phase calculation circuit calculates the correction phase with respect to each of the plurality of antennas.

9. The wireless communication device according to claim 1, wherein the deviation between the reception phase and the ideal phase includes a phase difference introduced due to at least one of an arrangement of the antennas, respective wiring lengths of the antennas, and switching performed in the antenna switch.

10. The wireless communication device according to claim 9, wherein the ideal phase is calculated for each of the plurality of antennas based on a predetermined arrival angle at which the calibration signal from the calibration antenna arrives at the antenna and a predetermined interval separating the antenna and an adjacent one of the plurality of antennas.

11. The wireless communication device according to claim 6, wherein the correction phase corrects a phase difference introduced due to the switching between the ports.

12. A wireless communication system including a wireless communication device configured to perform time division duplex, a calibration antenna, and a plurality of antennas, the wireless communication device comprising:

an antenna switch configured to incorporate a plurality of received signals from the plurality of antennas, to select one antenna from the plurality of antennas, and to supply a transmission signal to the selected antenna;

a reference oscillator configured to output a reference signal;

a transmission section including a first oscillator configured to generate, based on the reference signal, a first oscillation signal used as the transmission signal;

a reception section configured to receive input of a received signal from one of the plurality of antennas and to obtain a baseband signal from the received signal, by using a second oscillation signal generated based on the reference signal;

a control circuit configured to perform control so as to supply the transmission signal to the antenna switch at a time of transmission, and to supply the transmission signal to the calibration antenna, as a calibration signal, at a time of calibration;

a first switch provided between the transmission section and the calibration antenna;

a second switch provided between the transmission section and the antenna switch;

a correction phase calculation circuit configured to calculate a correction phase for correcting the baseband signal according to a deviation between a reception phase calculated based on the baseband signal obtained when the plurality of antennas receive the calibration signal transmitted from the calibration antenna and an ideal phase associated with the plurality of antennas;

a storage section configured to store the ideal phase and the correction phase;

a phase shifter configured to correct, based on the correction phase, a phase of the baseband signal obtained when the plurality of antennas receive a transmission signal from an unknown direction; and an arrival angle estimation section configured to estimate an arrival angle of the received transmission signal based on an output of the phase shifter, wherein:

the wireless communication device is selectively operable in a calibration mode and a transmission mode, in the calibration mode, the control circuit controls to set the first switch to a connected state to connect the transmission section to the calibration antenna and to set the second switch to a cutoff state to disconnect the transmission section from the antenna switch, so as to enable the supply of the calibration signal to the calibration antenna at the time of calibration, and in the transmission mode, the control circuit controls to set the first switch to a cutoff state to disconnect the transmission section from the calibration antenna and to set the second switch to a connected state to connect the transmission section to the antenna switch, so as to enable the supply of the transmission signal to the antenna switch at the time of transmission.

* * * * *